US010585281B2

(12) United States Patent
Yamamoto et al.

(10) Patent No.: US 10,585,281 B2
(45) Date of Patent: Mar. 10, 2020

(54) POLARIZING MEMBER AND HEAD-UP DISPLAY DEVICE COMPRISING SAME

(71) Applicant: Polatechno Co., Ltd., Niigata (JP)

(72) Inventors: Michiyuki Yamamoto, Niigata (JP); Takahiko Nishikata, Niigata (JP); Yoshitaka Takeichi, Niigata (JP)

(73) Assignee: POLATECHNO CO., LTD. (JP)

( * ) Notice: Subject to any disclaimer, the term of this patent is extended or adjusted under 35 U.S.C. 154(b) by 0 days.

(21) Appl. No.: 16/302,273

(22) PCT Filed: May 15, 2017

(86) PCT No.: PCT/JP2017/018218
§ 371 (c)(1),
(2) Date: Nov. 16, 2018

(87) PCT Pub. No.: WO2017/199916
PCT Pub. Date: Nov. 23, 2017

(65) Prior Publication Data
US 2019/0293931 A1    Sep. 26, 2019

(30) Foreign Application Priority Data

May 16, 2016 (JP) .................. 2016-097800

(51) Int. Cl.
*G02B 5/30* (2006.01)
*G02B 27/28* (2006.01)
(Continued)

(52) U.S. Cl.
CPC .......... *G02B 27/0101* (2013.01); *B60K 35/00* (2013.01); *G02B 5/30* (2013.01);
(Continued)

(58) Field of Classification Search
CPC ............... G02B 27/01; G02B 27/0101; G02B 27/0149; G02B 27/281; G02B 27/4277;
(Continued)

(56) References Cited

U.S. PATENT DOCUMENTS 6,156,397 A     12/2000   Stephenson
6,943,956 B2    9/2005    Furuya
(Continued)

FOREIGN PATENT DOCUMENTS

CN      1222234      7/1999
CN      102224182    10/2011
(Continued)

OTHER PUBLICATIONS

Japanese Office Action dated Jan. 22, 2019 issued in corresponding Japanese Application No. 2018-038186, with machine translation to English.
(Continued)

*Primary Examiner* — Mustak Choudhury
(74) *Attorney, Agent, or Firm* — Onello & Mello, LLP

(57) ABSTRACT

In the present invention, a light-transmitting cover 18 comprises: a polarizing plate 34 having a polarizer; a first support plate 30 adhered to the top surface of the polarizing plate 34 via an adhesive layer 32; and a second support plate 38 adhered to the bottom surface of the polarizing plate 34 via an adhesive layer 36.

5 Claims, 3 Drawing Sheets

(51) Int. Cl.
G02B 27/01 (2006.01)
B60K 35/00 (2006.01)

(52) U.S. Cl.
CPC ......... *G02B 27/01* (2013.01); *G02B 27/0149* (2013.01); *G02B 27/281* (2013.01); *B60K 2370/1529* (2019.05); *B60K 2370/334* (2019.05); *G02B 2027/0169* (2013.01)

(58) Field of Classification Search
CPC ........ G02B 5/30; G02B 5/305; G02B 5/1809; G02B 5/1814; G02B 5/3025; G02B 5/3033; G02B 5/3058; G02B 1/11; G02B 1/118; G02B 6/126; G02B 2027/0118; G02B 2027/0169; B60K 2370/1529; B60K 2370/334; B60K 35/00; F21V 9/14
USPC .... 359/204.3, 246, 251, 281, 283, 301, 352, 359/485.01–485.05, 488.01, 489.01, 630; 156/229; 427/558
See application file for complete search history.

(56) References Cited

U.S. PATENT DOCUMENTS

| | | | |
|---|---|---|---|
| 9,428,676 B2 | 8/2016 | Lee et al. | |
| 2005/0052752 A1* | 3/2005 | Furuya | G02B 27/01 359/630 |
| 2010/0157195 A1* | 6/2010 | Miyatake | G02B 5/3033 349/62 |
| 2012/0328855 A1 | 12/2012 | Yokogi et al. | |
| 2015/0043069 A1 | 2/2015 | Lee et al. | |
| 2015/0146294 A1* | 5/2015 | Watanabe | G02B 5/3033 359/487.02 |
| 2016/0084993 A1 | 3/2016 | Jung et al. | |

FOREIGN PATENT DOCUMENTS

| | | |
|---|---|---|
| CN | 104335085 | 2/2015 |
| CN | 104412138 | 3/2015 |
| JP | 01125486 | 8/1989 |
| JP | 0510079 | 1/1993 |
| JP | 05288929 | 11/1993 |
| JP | 06265724 | 9/1994 |
| JP | 10138794 | 5/1998 |
| JP | 2002296417 | 10/2002 |
| JP | 2008051999 | 3/2008 |
| JP | 2009134089 | 6/2009 |
| JP | 2010152025 | 7/2010 |
| JP | 2014015706 | 1/2014 |
| JP | 2014044244 | 3/2014 |
| JP | 2014174271 | 9/2014 |
| JP | 2015143028 | 8/2015 |
| JP | 6320645 | 5/2018 |

OTHER PUBLICATIONS

International Preliminary Report on Patentability dated Nov. 29, 2018 issued in corresponding International Application No. PCT/JP2017/018218, with English translation.
Chinese Office Action dated Mar. 21, 2019 issued in corresponding Chinese Application No. 201780030119.5, with English translation.
Korean Office Action dated May 3, 2019 issued in corresponding Korean Application No. 10-2018-7036394, with English translation.
Japanese Office Action dated Dec. 14, 2017 issued in corresponding Japanese Application No. 2017545986, with machine translation to English.
International Search Report and Written Opinion dated Jun. 13, 2017 issued in corresponding International Application No. PCT/JP2017/018218, with English translation of ISR.
Japanese Notice of Allowance dated Mar. 16, 2018 issued in corresponding Japanese Application No. 2017545986, with machine translation to English.
Chinese Office Action dated Aug. 22, 2019 issued in corresponding Chinese Application No. 201780030119.5, with English translation.
Japanese Office Action dated Aug. 27, 2019 issued in corresponding Japanese Application No. 2018-038186, with machine translation to English.
Chinese Office Action dated Nov. 21, 2019 issued in corresponding Chinese Application No. 201780030119.5, with machine translation to English.

* cited by examiner

POLARIZING MEMBER AND HEAD-UP DISPLAY DEVICE COMPRISING SAME

TECHNICAL FIELD

The present invention relates to a polarizing member and a head-up display device comprising the same.

BACKGROUND ART

Head-up display devices are used which display an image on a display unit such as a display, reflect the image on a mirror, and display the image on a glass plate or the like as a virtual image. The head-up display device is used for displaying information and the like in a state of being superimposed on a normal view of a user. The head-up display device has various applications such as in an automobile which displays information such as a vehicle speed on a windshield.

SUMMARY

Technical Problem

Incidentally, in a head-up display device for in-vehicle use or the like, a transparent cover is provided so that dust and dirt do not enter from a projection port through which an image is projected from the main body of the device onto a projection part such as a glass plate. A polycarbonate plate is used as the transparent cover. Here, there is a demand for a cover having polarization properties so as to shield sunlight incident from the outside without lowering the brightness of emitted light.

However, when a general polarizing plate is laminated with the polycarbonate plate so as to impart the polarization properties to the cover, there is a possibility that the polycarbonate plate will cause deflection due to heat, and cause deformation in a projected image, or become detached from a housing due to curling.

In addition, when the head-up display device is used for interior parts of vehicles and the like, it is also necessary for the cover having the polarization properties to satisfy demanded criteria of a combustion test.

Solution to Problem

One embodiment of the present invention is a polarizing member that includes: a polarizing plate having a polarizer; a first support plate which is laminated with a front surface of the polarizing plate via a adhesive layer; and a second support plate which is laminated with a rear surface of the polarizing plate via a adhesive layer.

A head-up display device preferably includes: the polarizing member; a display unit that outputs an image; and a housing that houses the display unit therein, wherein the polarizing member is used as a transparent cover that transmits the image output from the display unit to an outside of the housing.

Advantageous Effects of Embodiments

According to the present invention, there can be provided a polarizing member that has flame retardance while reducing the deformation of an image, and a head-up display device which uses the same.

DESCRIPTION OF EMBODIMENTS

Figure 1:
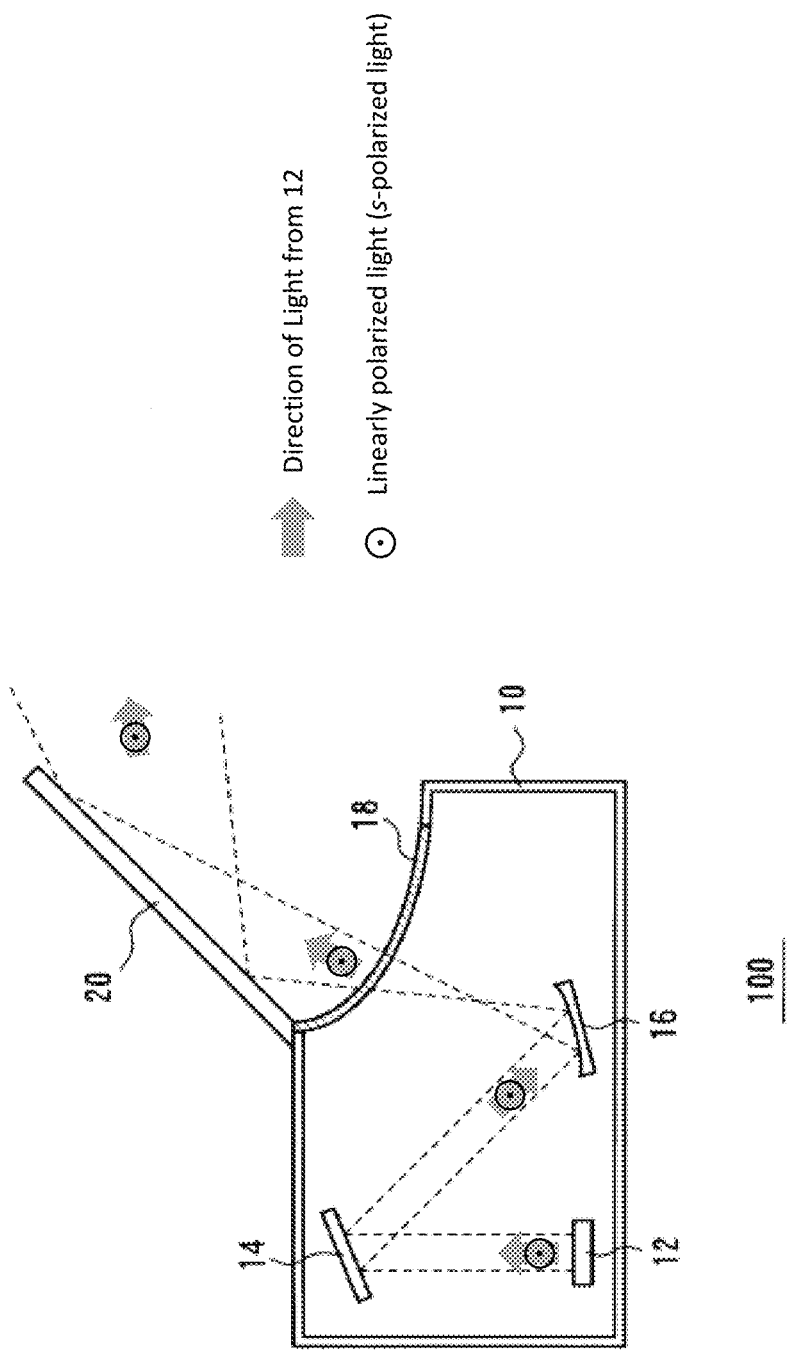
FIG. 1 shows a view showing a configuration of a head-up display according to an embodiment of the present invention.

A head-up display device 100 in an embodiment of the present invention includes: a housing 10; a display unit 12; a flat mirror 14; a concave mirror 16; a transparent cover (polarizing member) 18; and a projection part 20, as shown in FIG. 1.

The housing 10 houses components such as the display unit 12, the flat mirror 14 and the concave mirror 16 which constitute the head-up display device 100. The housing 10 is formed of a material having a mechanical strength, such as plastic or metal.

The display unit 12 is a device that outputs an image to be projected by the head-up display device 100. The display unit 12 is formed of a liquid crystal display (LCD) or the like. Image light emitted from the display unit 12 is linearly polarized.

The flat mirror 14 is provided so as to reflect the image light emitted from the display unit 12 toward the concave mirror 16. The concave mirror 16 is provided so as to reflect the image light having reached there from the flat mirror 14, and reflect the image light toward the projection part 20. The concave mirror 16 magnifies the image light at a desired magnification, and projects the magnified image light onto the projection part 20.

The transparent cover 18 is a transparent plate-like member which is installed in an opening provided in the housing 10. The transparent cover 18 is provided so as to transmit the image light reflected by the concave mirror 16 to the outside of the housing 10, and to prevent dust and dirt from entering the inside of the housing 10. The configuration of the transparent cover 18 will be described later.

The projection part 20 receives the image light having arrived from the concave mirror 16, and displays the virtual image as a projected image. The projection part 20 may use a half mirror or a holographic element to protect the normal eyesight of the user. In addition, it is also preferable for the projection part 20 to be configured so that the attachment angle and the attachment position can be changed with respect to the housing 10. Thereby, it is possible to adjust the position and angle of the projection part 20 so that the projected image is easy to see in accordance with the sight line of the user.

Figure 2:
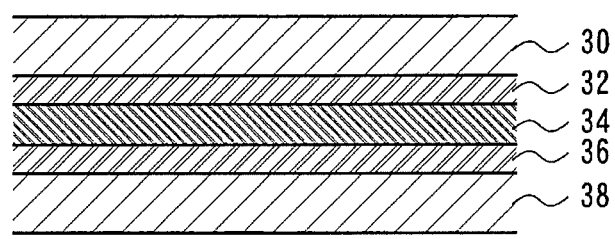
FIG. 2 shows a view showing a configuration of a transparent cover (polarizing plate) in an embodiment of the present invention.

The transparent cover 18 is configured to include a polarizing plate 34 having a polarizer. FIG. 2 shows a cross-sectional structure of one example of the transparent cover 18. In the present embodiment, the transparent cover 18 has a configuration in which a first support plate 30, a adhesive layer 32, a polarizing plate 34, a adhesive layer 36 and a second support plate 38 are stacked.

The polarizing plate 34 is a layer that includes a polarizer which transmits only light polarized in a specific direction. The polarizing plate 34 can be arbitrarily selected, but it is preferable to use, for example, a dye-based polarizing plate which is a polyvinyl alcohol (PVA) film dyed with a dichroic dye. As for the PVA film, for example, VF-PS #7500 made by KURARAY CO., LTD. or the like can be used. The PVA film is stretched so that a film having a thickness of 75 μm before stretching, for example, becomes a thickness of approximately 30 μm after stretching.

The polarizing plate 34 is formed on one surface of the PVA film. It is preferable for the polarizing plate 34 to be formed of a dye-based material. It is more preferable for the dye-based material to employ a dichroic dye. Here, it is preferable that the dye-based material contains an azo compound and/or a salt thereof.

Specifically, it is preferable to use a dye-based material which satisfies the following chemical formula.

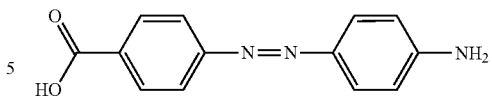

[Chem. 2]

To 300 parts of water, 12 parts of the monoazo compound of the chemical formula (2) and 21 parts of 4,4'-dinitrostil-

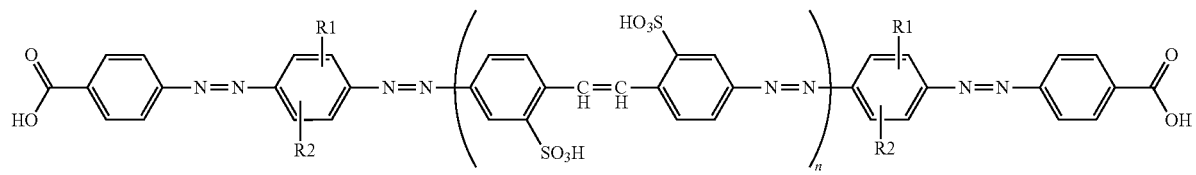

[Chem. 1]

(1) An azo compound and a salt thereof, wherein in the formula, R1 and R2 each independently represent a hydrogen atom, a lower alkyl group or a lower alkoxyl group, and n is 1 or 2.

(2) The azo compound and salt thereof described in (1), wherein R1 and R2 are each independently any of a hydrogen atom, a methyl group and a methoxy group.

(3) The azo compound and salt thereof described in (1), wherein R1 and R2 are each a hydrogen atom.

bene-2,2'-sulfonic acid are dissolved, 12 parts of sodium hydroxide is added thereto, and the mixture is subjected to a condensation reaction at 90° C. Subsequently, the resultant mixture is reduced by 9 parts of glucose, and is salted out by sodium chloride. After that, the mixture is filtered to obtain 16 parts of an azo compound which is represented by the chemical formula (3).

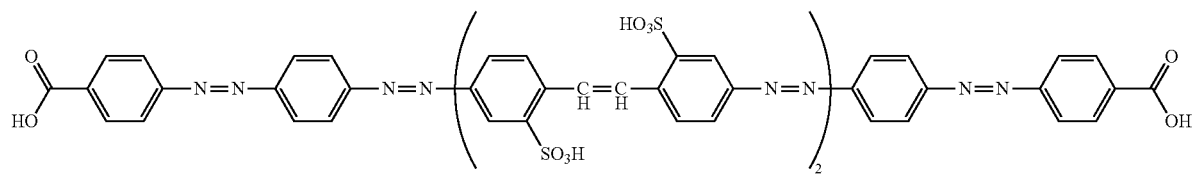

[Chem. 3]

It is preferable to use a material to be obtained by the following process, for example. To 500 parts of water, 13.7 parts of 4-aminobenzoic acid is added, and dissolved with sodium hydroxide. The obtained material is cooled, 32 parts of 35% hydrochloric acid is added thereto at 10° C. or lower, then 6.9 parts of sodium nitrite is added thereto, and the mixture is stirred for 1 hour at 5 to 10° C. To the resultant mixture, 20.9 parts of sodium aniline-ω-methanesulfonate is added, and sodium carbonate is added thereto so that the pH becomes 3.5, while the mixture is stirred at 20 to 30° C. The mixture is further stirred to complete a coupling reaction, and the resultant mixture is filtered to obtain a monoazo compound. The obtained monoazo compound is stirred at 90° C. in the presence of sodium hydroxide, and 17 parts of the monoazo compound of the chemical formula (2) is obtained.

Furthermore, the polyvinyl alcohol (PVA) having a thickness of 75 μM, which is a substrate, is immersed in an aqueous solution for 4 minutes at 45° C., the aqueous solution including, by concentration: 0.01% of the dye of the compound (3); 0.01% of CI Direct Red 81; 0.03% of a dye represented by the following structural formula (4), which is shown in Example 1 of JP 2622748 B; 0.03% of a dye represented by the following structural formula (5), which is disclosed in Example 23 of JP Sho 60456759 A; and 0.1% of sodium sulfate. This film is stretched by 5 times in a 3% boric acid aqueous solution at 50° C., is washed with water with the tension state being maintained, and is dried. Thereby, it is possible to obtain a dye-based material which becomes a neutral color (gray in parallel position, and black in orthogonal position).

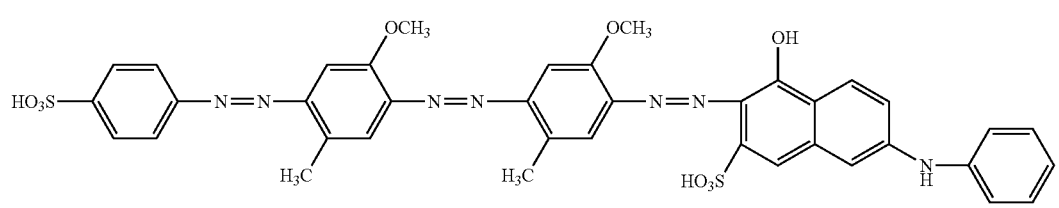

[Chem. 4]

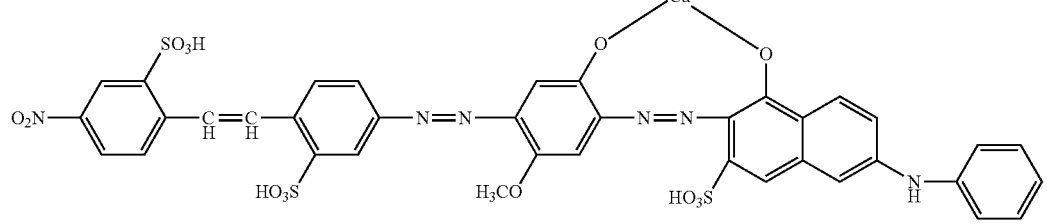

[Chem. 5]

In addition, the polarizing plate 34 may form a structure in which the polarizing film obtained by the above described production method is laminated with the substrate. The substrate is a member that will become a protective layer of the polarizing plate 34. The substrate can be arbitrarily selected, but it is preferable to use, for example, a triacetyl cellulose (TAC) film, an acrylic film and a cyclic olefin-based film. As one example, P960GL made by TacBright Optronics Corp., or the like can be used. The thickness of the substrate is not limited to this, but is preferably set at 20 μm or more and 200 μm or less. It is preferable to provide the substrate on both surfaces of the polarizing film.

The adhesive layer 32 is a layer for laminating the polarizing plate 34 with the first support plate 30. In addition, the adhesive layer 36 is a layer for laminating the polarizing plate 34 with the second support plate 38. A pressure sensitive adhesive or an adhesive to be used in the adhesive layer 32 and the adhesive layer 36 is not particularly limited, and any flame-retardant adhesive may be used. In addition, the adhesive layer 32 and the adhesive layer 36 are preferably formed of such a material as to absorb (buffer) the force at the time when a force such as thermal stress has been applied between the polarizing plate 34 and the first support plate 30 or the second support plate 38. For example, it is preferable to use a polyvinyl alcohol-based a pressure-sensitive adhesive or adhesive in the adhesive layer 32 and the adhesive layer 36. The film thicknesses of the adhesive layer 32 and the adhesive layer 36 are preferably set at 1 μm or less.

In addition, as a result of the adhesive layer 32 and the adhesive layer 36 being applied, the transparent cover 18 which has lower flammability than a conventional cover can be provided. In particular, due to a polyvinyl alcohol-based adhesive being used as the adhesive layer 32 and the adhesive layer 36, the flammability can be lowered. In addition, as a result of the thicknesses of the adhesive layer 32 and the adhesive layer 36 having been set at 1 μm or less, the flammability can be further lowered.

The first support plate 30 and the second support plate 38 are members for mechanically supporting the transparent cover 18. Specifically, the first support plate 30 is stuck on the front surface of the polarizing plate 34 via the adhesive layer 32, and the second support plate 38 is stuck on the rear surface of the polarizing plate 34 via the adhesive layer 36.

The first support plate 30 and the second support plate 38 preferably include a flame-retardant plastic plate. Specifically, with the first support plate 30 and the second support plate 38 which are formed of the flame-retardant plastic plate, the head-up display device 100 can be achieved which conforms to the standard for mounting the device on an automobile or the like.

Here, the first support plate 30 and the second support plate 38 preferably have a flat surface, so as not to generate deformation in the image which has passed through the transparent cover 18. In addition, it is preferable to use support plates having such a low phase difference as not to cause a phase difference in the transmitted light, so that the light (polarized light) which has passed through the transparent cover 18 does not become disordered.

Preferable examples to be used for the first support plate 30 and the second support plate 38 are a polycarbonate (PC) plate, an acrylic resin plate, a cellulose plate and a nylon plate. In addition, the first support plate 30 and the second support plate 38 may be formed from a material which is a combustible material having been subjected to non-combustion treatment. Considering the mechanical strength of the transparent cover 18, the first support plate 30 and the second support plate 38 preferably each have a thickness of 50 μm or more.

Figure 3:
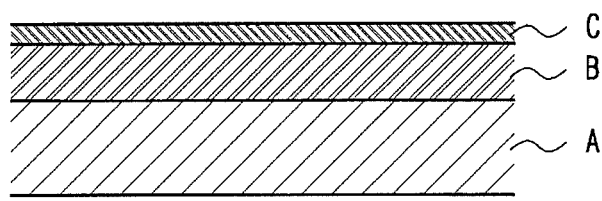
FIG. 3 shows a view showing a configuration example of a support plate in an embodiment of the present invention.

In addition, the first support plate 30 and the second support plate 38 may not be a single layer but may have a structure in which a plurality of layers are stacked. For example, it is preferable to adopt a structure in which a main plate A is a polycarbonate (PC) plate, and an acrylic resin plate is stacked thereon as a sub-plate B, as shown in FIG. 3. The acrylic resin plate can be formed from polymethyl methacrylate (PMMA), for example.

Furthermore, the first support plate 30 and the second support plate 38 may be each provided with a protective layer C such as HC (Hard Coat), AG (Anti-Glare), AR (Anti-Reflection) and LR (Low-Reflection), so as to protect each surface. HC means a coating which shows a hardness of H or more as a result of a pencil hardness test (load of 4.9 N) specified in JIS K 5600-5-4.

However, in order to reduce the occurrence of deflection of the transparent cover 18, these sub-plates B and protective layer C preferably have, when being provided, a vertically symmetrical structure along the film thickness direction of the transparent cover 18.

The transparent cover 18 is preferably arranged, when being mounted on the head-up display device 100, so that the polarization direction of light (linearly polarized light)

which is output from the display unit 12 and passes through the transparent cover 18 becomes parallel to the polarization direction of the polarizing plate 34 of the transparent cover 18.

Thereby, there can be provided a transparent cover 18 which can largely cut light (sunlight or the like) incident on the transparent cover 18 from the outside of the head-up display device 100, and can transmit most of the light which is output from the display unit 12. Accordingly, it is possible to achieve the head-up display device 100 with which visibility of the image is enhanced.

In addition, the front surface and the rear surface of the polarizing plate 34 are supported by the first support plate 30 and the second support plate 38, respectively, and the mechanical strength of the transparent cover 18 can thereby be enhanced.

Furthermore, the polarizing plate 34 is sandwiched between the first support plate 30 and the second support plate 38 from the front surface side and the rear surface side so as to be symmetrical to each other in the plate thickness direction, and the warpage can be thereby reduced when the thermal stress is applied to the transparent cover 18. Specifically, when the transparent cover 18 is heated by irradiation with light coming from the display unit 12 or sunlight from the outside, the transparent cover 18 balances the stress which is generated on the front surface side of the polarizing plate 34 at the interface with the first support plate 30, with the stress which is generated on the rear surface side of the polarizing plate 34 at the interface with the second support plate 38, and can thereby reduce the warpage (deflection) or deformation which occurs therein.

In addition, when an iodine-based polarizing film is applied to the transparent cover 18, discoloration of the polarizing film occurs due to heating at 90° C. or higher, resulting in the transmittance of light being lowered. On the other hand, by using a dye-based material as the polarizing plate 34 as in the present embodiment, the transparent cover 18 can maintain a high transmittance of light without causing the discoloration while reducing its deformation, even in a use environment of 90° C. or higher.

For example, the transparent cover 18 can be formed by using EHC-125U (film thickness of 215 μm) made by Polatechno Co., Ltd. for the polarizing plate 34, and laminating the first support plate 30 and the second support plate 38 of MRF08U made by Mitsubishi Gas Chemical Company, Inc. with both sides of the polarizing plate 34, with the adhesive layer 32 and the adhesive layer 36, respectively. In the transparent cover 18, the transmittance of natural light (sunlight) is approximately 40%, and the transparent cover 18 can cut approximately 60%. On the other hand, the transmittance of the linearly polarized light was approximately 78%, and the transparent cover 18 could transmit approximately 78% of the emitted light from the display unit 12.

In addition, when the transparent cover 18 was heated at 105° C. for 24 hours, the warpage and/or the deformation did not occur. On the other hand, in the case where only one of the first support plate 30 and the second support plate 38 was provided, when the transparent cover 18 was heated at 105° C. for 24 hours, a deflection of approximately 40 mm occurred.

Incidentally, in the present embodiment, an example was described in which the polarizing plate was applied to the transparent cover 18, but a component to which the polarizing plate is applied is not limited to the transparent cover 18 in the present embodiment.

In addition, it has been described that the first support plate 30 and the second support plate 38 preferably include a flame-retardant plastic plate, but specifically, it is preferable to use a material in which polycarbonate (PC) is mixed or is coated with at least one of metal, halogen and phosphorus to acquire flame retardancy. Considering the price, coloring, characteristics of polycarbonate (PC) and influence on the environment, it is more preferable to use bromine among halogens. When the polycarbonate (PC) is mixed with at least one of the metal, the halogen and the phosphorus, it is preferable to knead the selected raw material into the polycarbonate (PC).

An example in which a flame-retardant plastic plate is applied to the first support plate 30 and the second support plate 38, and Comparative Examples with respect to the Example, will be described below. In the Example, a flame-retardant polycarbonate (PC) in which the PC was mixed with at least one of metal, bromine, phosphorus and halogen was applied to the first support plate 30 and the second support plate 38 in the above described embodiment. On the other hand, in Comparative Example 1, general polycarbonate (PC) (LEXAN 8010Q made by SABIC) was applied to the first support plate 30 and the second support plate 38. In addition, Comparative Example 2 was configured so that flame-retardant PC was applied to the first support plate 30, and the second support plate 38 was not provided.

The Example was subjected to the flammability test (No. 302) for the automotive interior at Federal Motor Vehicle Safety Standards (FMVSS) in the United States, and was self-extinguished before reaching a marked line. In contrast, Comparative Example 1 could not clear the flammability test (No. 302). In addition, Comparative Example 2 cleared the flammability test (No. 302) for ignition from the side on which the first support plate 30 was provided, but could not clear the flammability test (No. 302) for the ignition from the polarizing plate 34 side on which the second support plate 38 was not provided.

In addition, in the Example, Comparative Example 1 and Comparative Example 2, warpage was checked when heating at 105° C. was conducted for 48 hours. In the Example and Comparative Example 1, change in shape was not observed. Specifically, in the Example and Comparative Example 1, deflection or waviness was not observed. In contrast, in Comparative Example 2, a large change in shape was observed.

Incidentally, the above described effect can be obtained if the mixed amount of at least one of metal, halogen and phosphor is larger than general polycarbonate (PC) (for example, LEXAN 8010Q made by SABIC).

As described above, as a result of the flame-retardant plastic plate being applied to the first support plate 30 and the second support plate 38, the polarizing member can clear the standard of the flammability test (No. 302) for the automotive interior at the Federal Motor Vehicle Safety Standards (FMVSS) in the United States. In addition, the polarizing member can reduce the deflection and waviness that could not be prevented conventionally.

The invention claimed is:

1. A head-up display comprising:
   a polarizing member comprising:
   a polarizing plate having a polarizer and using a dye-based polarizing material comprising a polyvinyl alcohol (PVA) film dyed with a dichroic dye, the polarizer being positioned so that its polarization direction is parallel to a polarized light output from a display unit and passing through the polarizing member;

a first support plate that is laminated with a front surface of the polarizing plate via an adhesive layer; and a second support plate that is laminated with a rear surface of the polarizing plate via an adhesive layer, wherein the first support plate and the second support plate are laminated to the polarizing plate so as to form a structure that is vertically symmetric in a plate thickness direction;

a display unit that outputs an image; and a housing that houses the display unit therein, wherein the polarizing member is used as a transparent cover that transmits the image to outside of the housing, and the polarizing member projects, as a projected image, a virtual image of said image that has passed through the polarizing plate.

2. The head-up display according to claim 1, wherein the first support plate and the second support plate each include a flame-retardant plastic plate.

3. The head-up display according to claim 2, wherein the first support plate and the second support plate have a structure in which a hard coat layer is stacked on at least one of a polycarbonate layer and an acrylic resin layer.

4. The head-up display according to claim 3, wherein the first support plate and the second support plate each include at least one of metal, halogen and phosphorus.

5. The head-up display according to claim 2, wherein the first support plate and the second support plate each include at least one of metal, halogen and phosphorus.

* * * * *